(12) United States Patent
Åström et al.

(10) Patent No.: US 10,517,053 B2
(45) Date of Patent: Dec. 24, 2019

(54) RADIO (NR) WIDEBAND SYNC DETECTION

(71) Applicant: Telefonaktiebolaget LM Ericsson (publ), Stockholm (SE)

(72) Inventors: Magnus Åström, Lund (SE); Fredrik Nordström, Lund (SE); Andres Reial, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/062,720

(22) PCT Filed: Mar. 15, 2018

(86) PCT No.: PCT/EP2018/056505
§ 371 (c)(1),
(2) Date: Jun. 15, 2018

(87) PCT Pub. No.: WO2018/172174
PCT Pub. Date: Sep. 27, 2018

(65) Prior Publication Data
US 2019/0141646 A1    May 9, 2019

Related U.S. Application Data

(60) Provisional application No. 62/476,647, filed on Mar. 24, 2017.

(51) Int. Cl.
*H04W 56/00* (2009.01)
*H04J 11/00* (2006.01)
(Continued)

(52) U.S. Cl.
CPC ....... *H04W 56/001* (2013.01); *H04J 11/0073* (2013.01); *H04L 5/0007* (2013.01);
(Continued)

(58) Field of Classification Search
CPC ............... H04J 11/0073; H04J 27/2618; H04J 27/2657; H04J 27/2663; H04J 5/0007; H04J 56/001
See application file for complete search history.

(56) References Cited

U.S. PATENT DOCUMENTS 5,668,837 A   9/1997 Dent
5,802,461 A   9/1998 Gatherer
(Continued)

FOREIGN PATENT DOCUMENTS

WO   2017184837 A1   10/2017
WO   2018073683 A1   4/2018
WO   2018169963 A1   9/2018

OTHER PUBLICATIONS

R1-1906041; Initial access signal and channels in NR unlicensed band; 3GPP TSG RAN WG1 Meeting #97; Reno, USA, May 13-17, 2019 (Year: 2019).*
(Continued)

*Primary Examiner* — Nader Bolourchi
(74) *Attorney, Agent, or Firm* — Coats & Bennett, PLLC

(57) ABSTRACT

A network sync signal with unknown frequency location is detected by sampling the received signal over a band of interest in frequency, and over the repetition period of the sync signal in time. The signal is converted to the frequency domain. Sub-bands of the frequency-domain signal, corresponding to different possible sync locations and frequency offsets, are extracted and converted to the time domain, where the sync signal is searched over the reception window length using time-domain matched filtering.

22 Claims, 6 Drawing Sheets

(51) Int. Cl.
  *H04L 27/26* (2006.01)
  *H04L 5/00* (2006.01)
(52) U.S. Cl.
  CPC ...... *H04L 27/2618* (2013.01); *H04L 27/2657* (2013.01); *H04L 27/2663* (2013.01)

(56) References Cited

U.S. PATENT DOCUMENTS

| | | | |
|---|---|---|---|
| 2005/0249181 | A1 | 11/2005 | Vijayan et al. |
| 2008/0069060 | A1 | 3/2008 | Das et al. |
| 2010/0041338 | A1 | 2/2010 | Hannagan |
| 2012/0307743 | A1 | 12/2012 | McGowan et al. |
| 2015/0071258 | A1 | 3/2015 | Sanguinetti et al. |
| 2017/0094621 | A1 | 3/2017 | Xu et al. |
| 2017/0135052 | A1 | 5/2017 | Lei et al. |
| 2017/0311276 | A1* | 10/2017 | Tsai ............... H04B 7/0617 |
| 2017/0346669 | A1 | 11/2017 | Yu et al. |
| 2018/0270771 | A1 | 9/2018 | Chendamarai Kannan et al. |

OTHER PUBLICATIONS

R1-1809184; Discussion on SSB transmission for NR-U; 3GPP TSG RAN WG1 Meeting #94; Gothenburg, Sweden, Aug. 20-24, 2018 (Year: 2018).*

R1-1807229; Discussion on SSB design for NR-U, Potevio; 3GPP TSG RAN WG1 Meeting #93; Busan, Korea, May 21-25, 2018 (Year: 2018).*

Jiapei Lin, Mao Wang; "The Primary Synchronization Signal of 5G NR," 14th International Conference on Wireless Communications, Networking and Mobile Computing (WiCOM 2018); Sep. 18-20, 2018; Chongqing, China, ISBN: 978-1-60595-578-0 (Year: 2018).*

MCC Support, 3GPP TSG RAN WG1 Meeting #88bis, R1-1704172, Final Report of 3GPP TSG RAN WG 1 #88 v. 1.0.0 (Athens, Greence, Feb. 13-17, 2017), Spokane, USA, Apr. 3-7, 2017, pp. 1-152.

Ericsson, 3GPP TSG-RAN WG1 #89s, R1-1706890, Narrowband measurement accuracy improvement for NB-IoT, 6.2.7.2, Hangzhou, China, May 15-19, 2017, pp. 1-9.

Sierra Wireless, 3GPP TSG RAN WG1 Meeting #86bis, R1-1609818, NR SS Design for Wideband and Narrowband UEs, 8.1.5.1 Synchronization signal and DL broadcast signal/channel, Lisbon, Portugal, Oct. 10-14, 2016.

Ericsson, QUALCOMM, 3GPP TSG RAN Meeting #75, RP-170732, New WID on Even further enhanced MTC for LTE, 10.1.1, Dubrovnik, Croatia, Mar. 6-9, 2017.

Ericsson, 3GPP TSG-RAN WG2 Meeting #90bis, R1-1716995, Reduced system acquisition time for MTC, 6.2.5.1, Prague, Czech Republic, Oct. 9-13, 2017.

Ericsson, 3GPP TSG-RAN WG1 Meeting #87, R1-1611899, NR Synchronization signal frequency raster, 7.1.2.1, Reno, Nevada, USA, Nov. 14-18, 2015.

Ericsson, 3GPP TSG-RAN WG1 Meeting #88, R1-1702122, NR Synchronization Complexity and Periodicity, 8.1.1.1.4, Athens, Greece, Feb. 13-17, 2017.

Ericsson, 3GPP TSG-RAN WG1 Meeting #88bis, R1-1706020, UE Cell Search Energy Consumption and Latency, 8.1.1.6, Spokane, Oregon, USA, Apr. 3-7, 2017.

Ericsson, 3GPP TSG-RAN1 WG1 Meeting #88, R1-1702121, NR System Sync Frequency Raster, 8.1.1.1.3, Athens, Greece, Feb. 13, 2017.

* cited by examiner

RADIO (NR) WIDEBAND SYNC DETECTION

FIELD OF INVENTION

The present invention relates generally to wireless communication networks, and in particular to a system and method of wideband synchronizaion signal detection in New Radio networks.

BACKGROUND

Wireless communication networks are ubiquitous in many parts of the world. Advances in state of the art in communication technology, increased power and sophistication of radio network devices such as User Equipment (UE), e.g., smartphones, and concomitant increases in the complexity and data exchange requirements of user applications, all require ever-increasing bandwidth and data rates in wireless networks implementations. The Third Generation Partnership Project (3GPP) develops and promulgaes technical standards that define the protocols and requirements of wireless networks, ensuring interoperabilty geographically and between equipment makers. 3GPP has delined, and operators worldwide have deployed, a $4^{th}$ generation (4G) standard known as Long Term Evolution (LTE), defined in 3GPP Technical Specification Releases 8-13. LTE includes numerous provisions to address high-bandwidth requirements, such as wider carriers (up to 20 MHz), carrier aggregation (allowing up to 100 MHz of aggregated bandwidth), multiple-antenna techniques (such as beamforming, MIMO), interference coordination (ICIC, COMP), and the like.

Current 3GPP standardization efforts relate to a $5^{th}$ generation (5G) standard, referred to as New Radio (NR). NR continues and expands LTE's support for higher bandwidth and data rates by defining operations above 6 GHz, and with even broader bandwidth component carriers. Simultaneously, NR provides support for low-cost, narrowband, high-reliability, low-power, high-coverage devices, sometimes referred to as Machine-to-Machine (M2M) communications, or the Internet of Things (IoT).

In either 4G or 5G networks, a radio network device desiring to connect to a wireless communication network must acquire network synchronization ('sync'). Network sync allows the radio network device to adjust its internal frequency relative the network, and discover the proper timing of signals received from the network. In NR, network sync will be performed using several signals.

The Primary Synchronization Signal (PSS) allows for network detection with a high frequency error, up to tens of parts per million (ppm). Additionally, PSS provides a network timing reference. 3GPP has selected mathematical constructs known as Zadoff-Chu sequences as PSS signals. One interesting property of ZC sequences is that by careful selection of two such sequences, the same correlation sequence may be used for detection, adding negligible complexity.

The Secondary Synchronization Signal (SSS) allows for more accurate frequency adjustments and channel estimation, while at the same time providing some fundamental network information, such as physical layer cell identity.

The Tertiary Synchronization Signal (TSS) provides timing information within a cell, e.g., between beams transmitted in a cell.

The Physical Broadcast Channel (PBCH) provides a subset of the minimum system information for random access.

These synchronization signals are periodically broadcast together in a System Synchronization Block (SSB). For a given transmission beam, the SSB is transmitted periodically, such as every 20 ms.

The SSB in NR will cover a larger bandwidth than in LTE. For example, the SSB may span 4.32 MHz for carrier frequencies below 6 GHZ, and may be substantially higher for carrier frequencies above 6 GHz.

The Physical Downlink Shared Channel ($PDSCH_{SIB}$) provides the remaining required parts of the minimum system information necessary for a radio network device to communicate with the network; however, the $PDSCH_{SIB}$ is not part of the SSB. The $PDSCH_{SIB}$ may be transmitted in resources indicated by PBCH.

In LTE, the sync signals are located in the center of a carrier's bandwidth. Additionally, the carrier frequencies may be estimated with the help of Cell-specific Reference Signals (CRS), which are always on and allow the radio network device receiver to perform a spectral estimation to identify different carrier locations. In contrast, in NR, the SSB will be located on absolute frequency positions in a fixed (possibly band-dependent) frequency grid, unrelated to the network center frequency. Hence, in NR networks, a radio network device must assume a grid search approach for network sync.

For this reason, and additionally to minimize the use of battery power-consuming radio electronics, it is desirable for a radio network device to record as large a bandwidth as possible, and then process and analyze the signals "offline," within the device, to identify PSS and other signal features.

Both LTE and NR use Orthogonal Frequency Division Multiplexing (OFDM) in the downlink, and a pre-coded version of OFDM called Single Carrier Frequency Division Multiple Access (SC-FDMA) in the uplink. This uplink multiplexing scheme was selected to reduce the Peak to Average Power Ratio (PAPR), thus alleviating the need for very expensive and inefficient power amplifiers in radio network devices, which would otherwise be required for high-PAPR techniques, such as OFDM.

It is known and useful to utilize time/frequency domain transformations in performing sync signal detection and processing. Well-known mathematical domain transforms include the Discrete Fourier Transform (DFT) and Fast Fourier Transform (FFT). An inherent property of the DFT is that the sampling time of the signal duration on which the DFT is applied is related to the spacing between the frequency bins of the transformed signal. This frequency bin spacing is also known as subcarrier spacing (SCS) if the sampled signal is an OFDM symbol sampled according to the nominal sample rate and symbol length. Typically, a NR OFDM sync symbol has a SCS of 30 kHz., translating into a symbol length of 33.3 μs (F=1/T), excluding the cyclic prefix (CP). The number of samples, N, per nominal sample period in that DFT determines the bandwidth of the signal in the frequency domain, BW=N×SCS. The sync is transmitted less often, say every 20 ms. Per above, a 20 ms symbol sampling window length translates into a 50 Hz subcarrier spacing, and the sampling rate is chosen such that the appropriate bandwidth is received, depending on the received analog signal. Hence, the longer time translates into a more detailed frequency resolution, albeit also requiring a longer DFT. FIG. 1 depicts this relationship.

One application of the DFT is as a liter bank, where a time signal is transformed into the frequency domain. In the frequency domain it is a straightforward task to separate the desired spectral content from the undesired content. Thereafter, it is possible to inverse DFT the desired content back into the time domain. Since only a subset of the spectral content is selected, it is possible to do the IDFT with a shorter length, implying less complexity. This also implies that the time domain transformation contains fewer samples than the original time domain signal. This only reflects the fact that a more narrowband signal may be resolved with a lower sampling rate and the signal duration remains unchanged. The described process amounts to band-pass filtering in the frequency domain.

In order for a DFT to be performed efficiently, a length of a power of two is typically chosen, i.e., $2^k$, where k is an integer. In this case it possible to use symmetries in the DFT and realize it with an FFT using, e.g., the Radix-2 algorithm. A Radix-2 implementation typically has the complexity of N log 2 N making also very long signals affordable to transform back and forth to the frequency domain.

The de facto standard LTE sync detection algorithm is briefly described in 3GPP contribution, R1-1611899, 3GPP TSG-RAN WG1 Meeting #87, Reno Nev., 14-18 Nov. 2015. The approach described therein assumes that the presence of a mobile communications Radio Access Technology (RAT) carrier in the spectrum is detectable based on power density estimation. However, for NR where, in the case of no data to transmit, little other signaling will take place (e.g., no always-on Cell-specific Reference Signals, or CRS). Hence, a simple and rapid spectrum estimation is not possible.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention described and claimed herein, a network sync signal with unknown frequency location is detected by sampling the received signal over a band of interest in frequency, and over the repetition period of the sync signal in time. The signal is converted to the frequency domain. Sub-bands of the frequency-domain signal, corresponding to different possible sync locations and frequency offsets, are extracted and converted to the time domain, where the sync signal is searched over the reception window length using time-domain matched filtering.

One embodiment relates to a method, performed by a radio network device, of synchronizing to a wireless communication network. A wideband signal is received for a duration of at least a sync signal repetition period, and the received wideband signal is stored. The received wideband signal is transformed to the frequency domain. A subset of frequency bins in the frequency domain signal that correspond to a sync frequency, numerology, and frequency error hypothesis is selected. The selected subset of the frequency domain signal is converted to the time domain. The time domain signal is filtered with a sync reference. A criterion is applied to detect a sync signal in the time domain signal.

Another embodiment relates to a radio network device. The device includes one or more antennas, and a transceiver, and processing circuitry operatively connected to the transceiver. The processing circuitry is operative to: receive a wideband signal for a duration of at least a sync signal repetition period and store the received wideband signal; transform the received wideband signal to the frequency domain; select a subset of frequency bins in the frequency domain signal that correspond to a sync frequency, numerology, and frequency error hypothesis; convert the selected subset of the frequency domain signal to the time domain; liter the time domain signal with a sync reference; and apply a criterion to detect a sync signal in the time domain signal.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
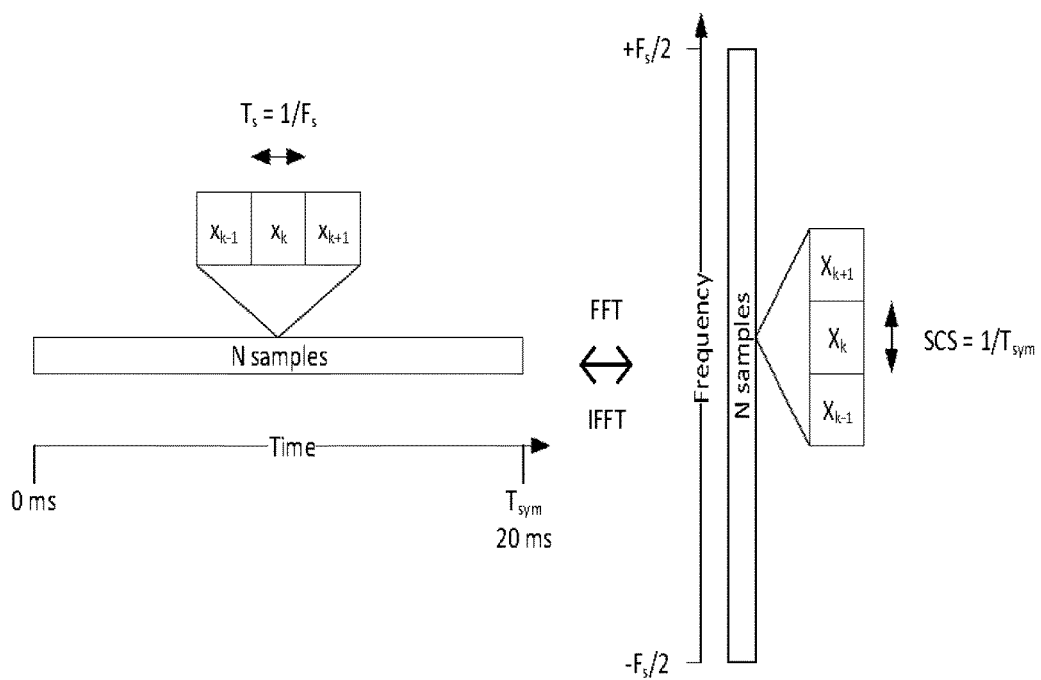
FIG. 1 are time and frequency domain diagrams depicting signal transformations.
Figure 2:
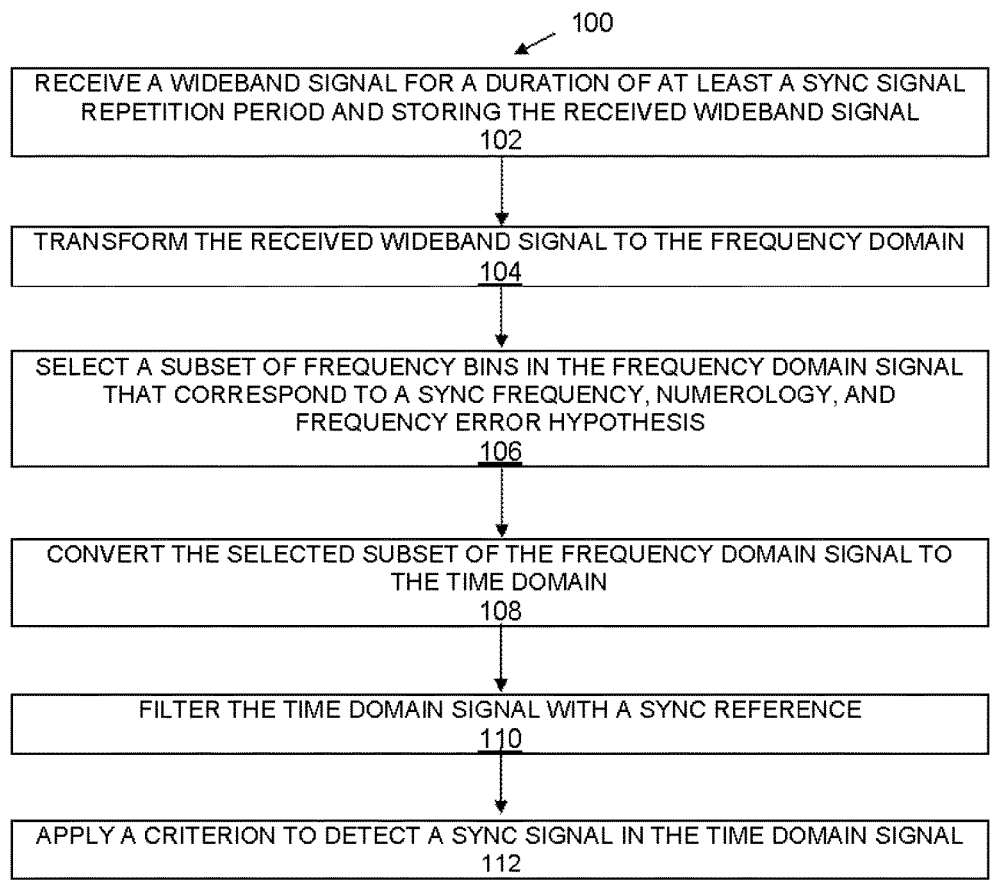
FIG. 2 is a flow diagram of a method of synchronizing to a wireless communication network by a radio network device.

FIG. 2 depicts the steps of a method 100, performed by a radio network device, of synchronizing to a wireless communication network. For example, the radio network device may attempt to sync in a wideband cellular band (e.g., LTE band 7 or an NR band) where sync signals are located on absolute frequency positions according to a predetermined sync raster, such as 1 MHz apart. However, not all sync positions will transmit sync signals, and the radio network device does not necessarily know á priori which positions contain a sync and which do not. Since modern radio network devices typically contain a wideband radio receiver, this can be used also for sync detection. Also, radio network devices typically permit saving received data to memory, allowing for off-line post processing.

The method 100 begins starts by the radio network device receiving a wideband signal, i.e., a signal having a wider bandwidth than the sync signal (block 102). The signal may be received for the duration of at least a sync signal repetition period, i.e., for the length of time it takes for the sync pattern to repeat itself. In another embodiment, the reception window length may be set to equal the sync repetition period plus the length of the sync signal transmission, e.g. the PSS length, SS block length, or SS burst length in NR. This ensures that at least one continuous instance of the sync signal is captured during the reception window. Upon reception, the wideband signal is recorded and stored in memory for post-processing.

Next, having received and recorded the wideband signal, it is transformed into the frequency domain (block 104), such as by using an FFT. In one embodiment, the signal is appended with zeros prior to the transformation. In another embodiment, the recording is extended such that a power-of-2 number of samples are recorded, exceeding the reception period. In yet another embodiment, a combination of these two approaches is used. In a still further embodiment, the sampling rate is adjusted so that the desired observation window length results in exactly $2^m$ samples.

Figure 3:
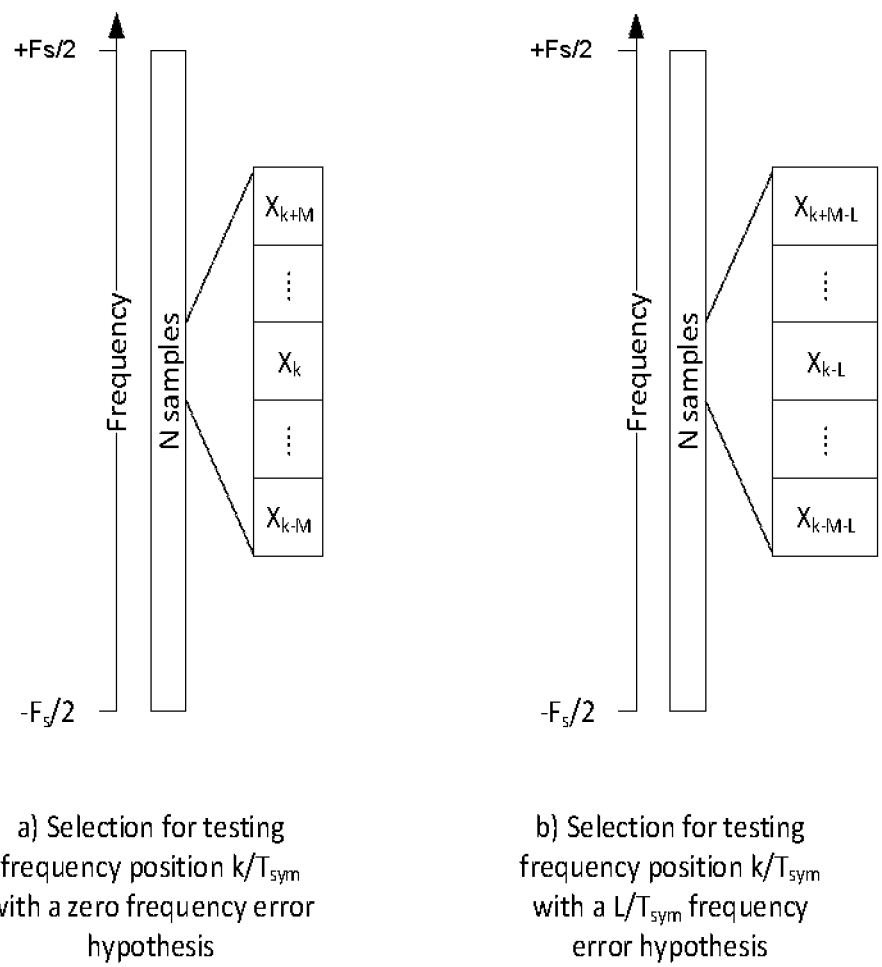
FIGS. 3A and 3B are time and frequency domain diagrams depicting signal transformations with and without frequency error hypotheses.

The radio network device decides on which frequency to attempt to search for sync in the frequency domain signal (block 106). The frequency may be selected according to a predefined order, or sequentially. The radio network device also determines a hypothesized frequency error. From these two parameters, the radio network device selects a subset of the frequency samples, or a subband, such that the entire sync bandwidth (including hypothesized frequency error) is included, and nothing else. See FIG. 3. If the desired frequency hypothesis accuracy is finer than the frequency bin spacing, the frequency samples may be interpolated to produce the effective desired frequency sampling phase.

The selected subset of the frequency domain is then transformed into the time domain again, such as by using a IDFT appropriate to the shorter signal subset (block 108). Also here, in one embodiment, the subset is appended by zeros to reach an even power-of-2 number of samples.

The time domain signal, which now has a bandwidth corresponding to the sync signal and is much more narrow than the signal recorded, is filtered with a matched liter that representing the sync reference signal (block 110). Here the sync reference is created such that it suits the resampled time domain signal, where the resampling arises from the zero padding.

Finally, a sync is detected according to some detection criterion (block 112). One such criterion is based on the magnitude (or power) of the matched filter output. In a further embodiment, a frequency error is determined by identifying which hypothesized frequency error was used for the successful detection. In another embodiment, the timing of the sync is detected as the filter output sample with the maximum magnitude (power) compensated for the group delay of the sync reference or half the length of the sync reference.

In a further embodiment, a more accurate frequency error estimation is possible by choosing a finer shift in the frequency subset around the frequency error for which sync was detected. For example, it may be known that a sync signal may be detected with a 7.5 kHz frequency error. Further assume that the sync period is 20 ms, corresponding to a 50 Hz SCS. In order to hypothesize with a 7.5 kHz raster, the difference between the starting points of two subsets for two frequency hypotheses corresponds to 150 subcarriers. Having detected sync in one of them, it is now possible to detect sync using a smaller difference, corresponding to a smaller frequency error. The frequency error resulting in the largest filter output of block 112 is then selected as the more accurate frequency error. In this manner, a very accurate frequency error may be determined down to an accuracy of the SCS, in the example, 50 Hz.

Figure 4:
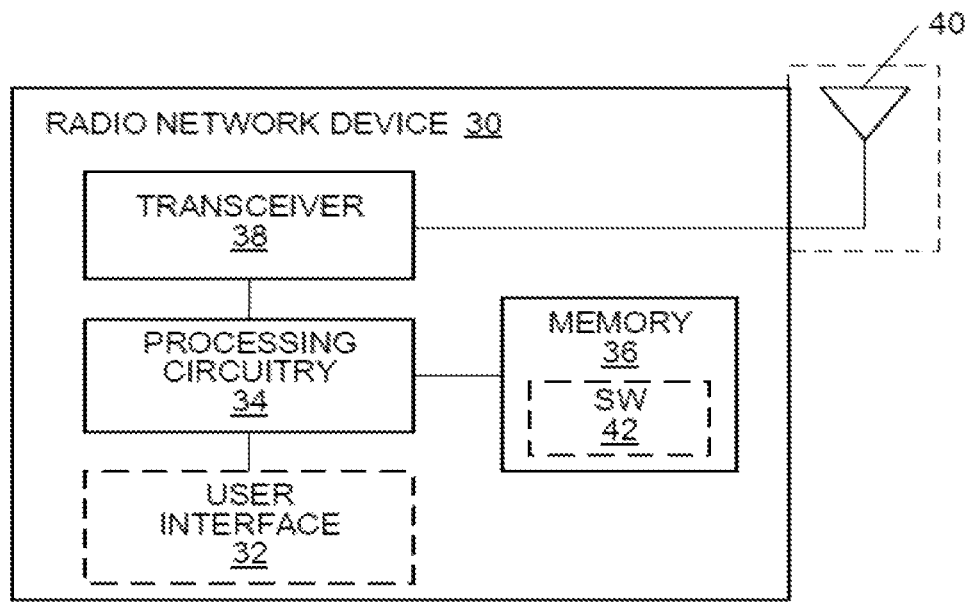
FIG. 4 is a block diagram of a radio network device.

FIG. 4 depicts a radio network device 30. A radio network device 30 is any type device capable of communicating with a network node and/or access point using radio signals. A radio network device 30 may therefore refer to a machine-to-machine (M2M) device, a machine-type communications (MTC) device, a Narrowband Internet of Things (NB IoT) device, etc. The radio network device 30 may also be a User Equipment (UE), such as a cellular telephone or "smartphone." A radio network device 30 may also be referred to as a radio device, a radio communication device, a radio network device, a wireless terminal, or simply a terminal— unless the context indicates otherwise, the use of any of these terms is intended to include device-to-device UEs or devices, machine-type devices, or devices capable of machine-to-machine communication, sensors equipped with a radio network device, wireless-enabled table computers, mobile terminals, smart phones, laptop-embedded equipped (LEE), laptop-mounted equipment (LME), USB dangles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be configured to transmit and/or receive data without direct human interaction.

In some embodiments, the radio network device 30 includes a user interface 32 (display, touchscreen, keyboard or keypad, microphone, speaker, and the like); in other embodiments, such as in many M2M, MTC, or NB IoT scenarios, the radio network device 30 may include only a minimal, or no, user interface 32 (as indicated by the dashed lines of block 32 in FIG. 4). The radio network device 30 also includes processing circuitry 34; memory 36; and radio circuits, such a transceiver 38, one or more antennas 40, and the like, to effect wireless communication across an air interface to one or more radio network nodes and/or access points. As indicated by the dashed lines, the antenna(s) 40 may protrude externally from the radio network device 30, or the antenna(s) 40 may be internal.

Figure 5:
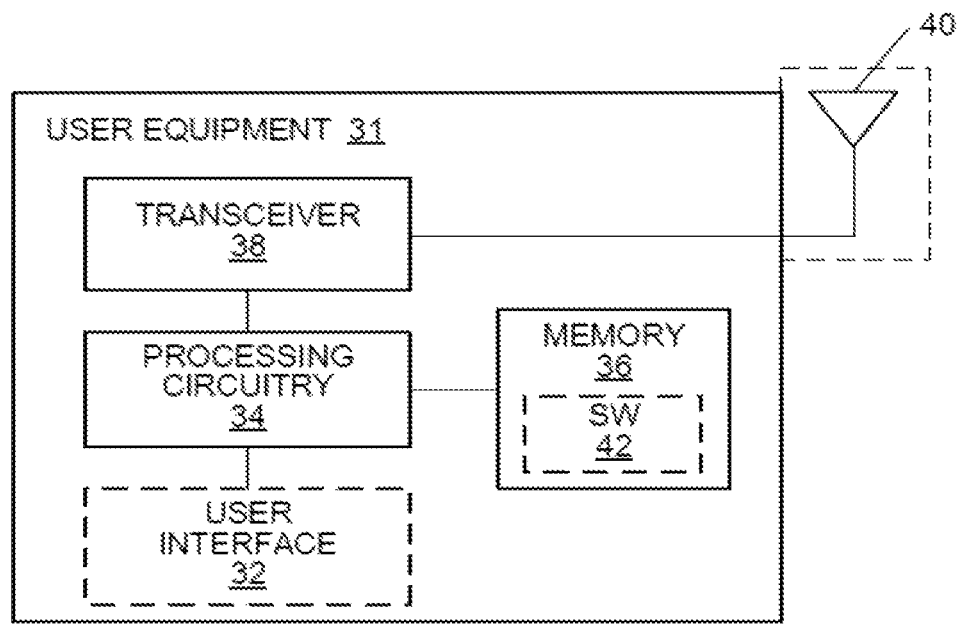
FIG. 5 is a block diagram of a UE.

FIG. 5 depicts an embodiment in which the radio network device 30 is a UE 31. In general, the UE 31 includes the same circuits and components described above. In particular, the UE 31 may include a sophisticated user interface 32, and may additionally include features such as a camera, accelerometer, satellite navigation signal receiver circuitry, vibrating motor, and the like (not depicted in FIG. 4).

The processing circuitry 34 may comprise any sequential state machine operative to execute machine instructions stored as machine-readable computer programs in memory 36, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), or any combination of the above.

The memory 36 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The radio circuits may comprise one or more transceivers 38 used to communicate with one or more other transceivers via a Radio Access Network (RAN) according to one or more communication protocols known in the art or that may be developed, such as IEEE 802.xx, CDMA, WCDMA, GSM, LTE, UTRAN, WIMax, NB-IoT, NR, or the like. The transceiver 38 implements transmitter and receiver functionality appropriate to the RAN links (e.g., frequency allocations and the like). The transmitter and receiver functions may share circuit components and/or software, or alternatively may be implemented separately.

According to embodiments of the present invention, the memory 36 is operative to store, and the processing circuitry 34 operative to execute, software 42 which when executed is operative to cause the radio network device 30 to synchronize to a wireless communication network transmitting sync signals on only some of predefined grid spacing in wideband carriers. In particular, the software 42, when executed on the processing circuitry 34, is operative to perform the method 100 described and claimed herein. This allows the radio network device 30 to reliably receive and process wideband sync signals without a priori knowledge of precisely where the sync signals are transmitted.

Figure 6:
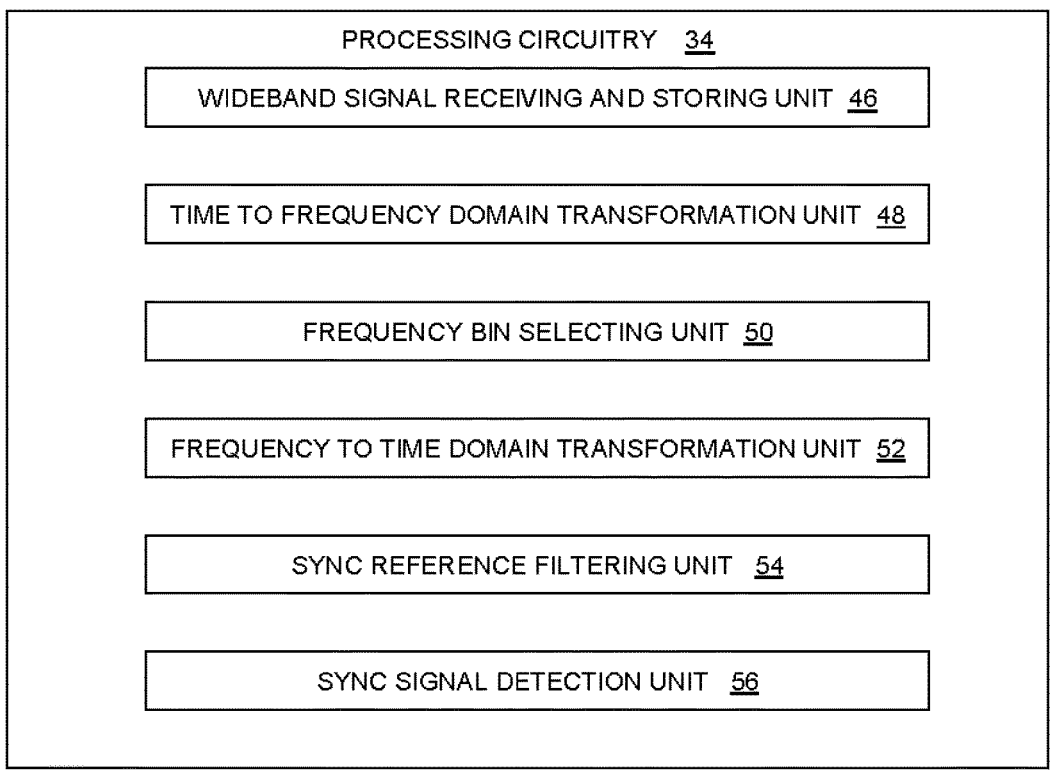
FIG. 6 is a diagram of physical units in processing circuitry in the radio network device of FIG. 4 or the UE of FIG. 5.

FIG. 6 illustrates example processing circuitry 34, such as that in the radio network device 30 of FIG. 4 or the UE 31 of FIG. 5. The processing circuitry 34 comprises a plurality of physical units. In particular, the processing circuitry 34 comprises a wideband signal receiving and storing unit 46, a time to frequency domain transformation unit 48, a frequency bin selecting unit 50, a frequency to time domain transformation unit 52, a sync reference filtering unit 54, and a sync signal detection unit 56.

The wideband signal receiving and storing unit 46 is configured to receive a wideband signal for a duration of at least a sync signal repetition period and store the received wideband signal. The time to frequency domain transformation unit 48 is configured to transform the received wideband signal to the frequency domain. The frequency bin selecting unit 50 is configured to select a subset of frequency bins in the frequency domain signal that correspond to a sync frequency, numerology, and frequency error hypothesis. The frequency to time domain transformation unit 52 is configured to convert the selected subset of the frequency domain signal to the time domain. The sync reference filtering unit 54 is configured to filter the time domain signal with a sync reference. The sync signal detection unit 56 is configured to applying a criterion to detect a sync signal in the time domain signal.

Figure 7:
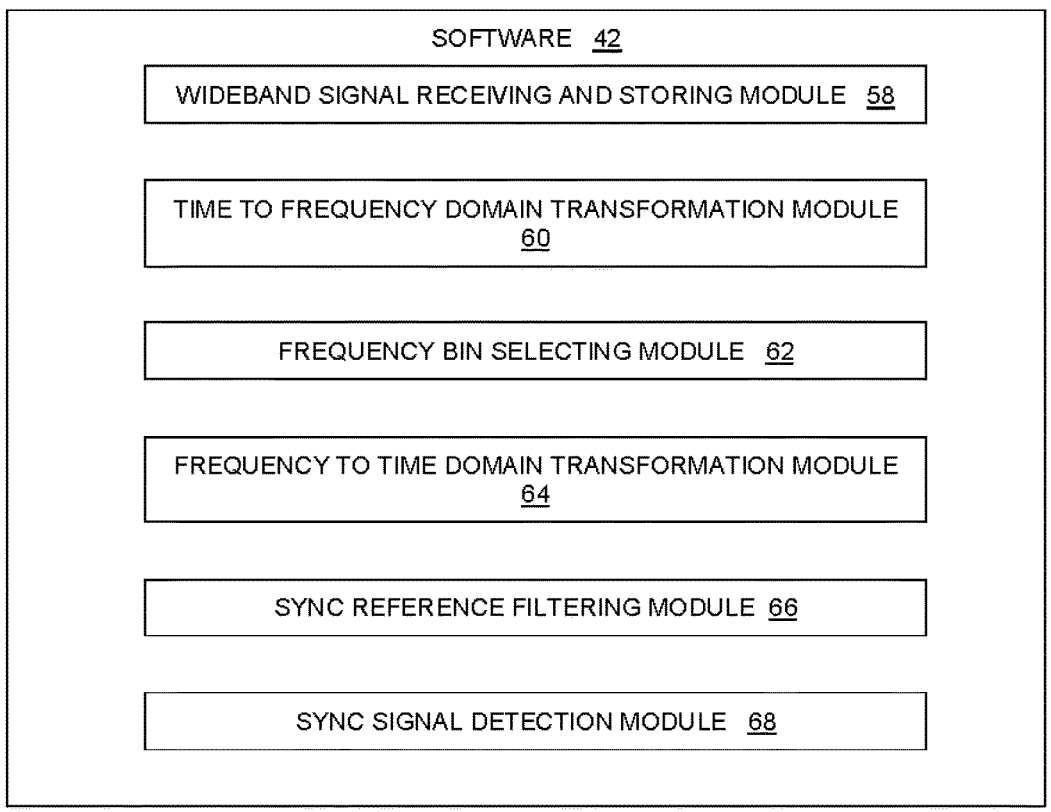
FIG. 7 is a diagram of software modules in memory in the radio network device of FIG. 4 or the UE of FIG. 5.

FIG. 7 illustrates example software 42, such as that in memory 36 in the radio network device 30 of FIG. 4 or the UE 31 of FIG. 5. The software 42 comprises a plurality of software modules. In particular, the software 42 comprises a wideband signal receiving and storing module 58, a time to frequency domain transformation module 60, a frequency bin selecting module 62, a frequency to time domain transformation module 64, a sync reference filtering module 66, and a sync signal detection module 68.

The wideband signal receiving and storing module 58 is configured to receive a wideband signal for a duration of at least a sync signal repetition period and store the received wideband signal. The time to frequency domain transformation module 60 is configured to transform the received wideband signal to the frequency domain. The frequency bin selecting module 62 is configured to select a subset of frequency bins in the frequency domain signal that correspond to a sync frequency, numerology, and frequency error hypothesis. The frequency to time domain transformation module 64 is configured to convert the selected subset of the frequency domain signal to the time domain. The sync reference filtering module 66 is configured to liter the time domain signal with a sync reference. The sync signal detection module 68 is configured to applying a criterion to detect a sync signal in the time domain signal.

Embodiments of the present invention present numerous advantages over the prior art. They allow efficient sync search when the sync locations in frequency are unknown to the radio network device, while power spectral density analysis of the spectrum is inefficient due to lean transmission in the absence of data. Embodiments of the invention result in improved sync detection and/or improved UE energy efficiency.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by a radio network device, of synchronizing to a wireless communication network, comprising:
   receiving a wideband signal for a duration of at least a sync signal repetition period and storing the received wideband signal;
   transforming the received wideband signal to a frequency domain to generate a frequency domain signal;
   selecting a subset of frequency bins in the frequency domain signal that correspond to a sync frequency, numerology, and frequency error hypothesis;
   converting the selected subset of the frequency bins in the frequency domain signal to a time domain to generate a time domain signal;
   filtering the time domain signal with a sync reference; and
   applying a criterion to detect the sync signal in the time domain signal.

2. The method of claim 1 wherein transforming the received wideband signal to the frequency domain comprises transforming the received wideband signal using Fast Fourier Transform (FFT).

3. The method of claim 1 wherein the received wideband signal is zero-padded in order to have length of a power-of-2.

4. The method of claim 1 wherein the selected subset of the frequency bins in the frequency domain signal is zero-padded in order to have length of a power-of-2.

5. The method of claim 1 wherein the sync reference is adjusted to suit the resulting sampling frequency of the time domain signal.

6. The method of claim 1 wherein a sync signal is detected by a magnitude of a correlation operation exceeding a threshold value.

7. The method of claim 1 wherein sync signal timing is determined as the filter output value resulting in the highest magnitude value, less the filter delay.

8. The method of claim 1 wherein the selecting, converting, filtering, and applying steps are repeated using different frequency error hypotheses, and further comprising selecting the hypothesis resulting in the largest filter output magnitude.

9. The method of claim 1 further comprising analyzing the spectrum in order to identify likely networks and hence likely sync candidate positions.

10. The method of claim 9 where the radio network device identifies a dominant network and from the dominate network identification and a dynamic range of its receiver, identifies sub-bands likely falling below the radio network device receiver's dynamic range.

11. A radio network device, comprising:
one or more antennas;
a transceiver; and
processing circuitry operatively connected to the transceiver and operative to receive a wideband signal for a duration of at least a sync signal repetition period and store the received wideband signal;
transform the received wideband signal to a frequency domain to generate a frequency domain signal;
select a subset of frequency bins in the frequency domain signal that correspond to a sync frequency, numerology, and frequency error hypothesis;
convert the selected subset of the frequency bins in the frequency domain signal to a time domain to generate a time domain signal;
filter the time domain signal with a sync reference; and
apply a criterion to detect the sync signal in the time domain signal.

12. The device of claim 11 wherein the processing circuitry is operative to transform the received wideband signal to the frequency domain by transforming the received wideband signal using Fast Fourier Transform (FFT).

13. The device of claim 11 wherein the processing circuitry is further operative to zero-pad the received wideband signal in order to have length of a power-of-2.

14. The device of claim 11 wherein the processing circuitry is further operative to zero-pad the selected subset of the frequency bins in the frequency domain signal in order to have length of a power-of-2.

15. The device of claim 11 wherein the processing circuitry is further operative to adjust the sync reference to suit the resulting sampling frequency of the time domain signal.

16. The device of claim 11 wherein the processing circuitry is further operative to detect a sync signal by a magnitude of a correlation operation exceeding a threshold value.

17. The device of claim 11 wherein the processing circuitry is further operative to determine sync signal timing as the filter output value resulting in the highest magnitude value, less the filter delay.

18. The device of claim 11 wherein the processing circuitry is further operative to repeat the selecting, converting, filtering, and applying steps using different frequency error hypotheses, and to select the hypothesis resulting in the largest filter output magnitude.

19. The device of claim 11 wherein the processing circuitry is further operative to analyze the spectrum in order to identify likely networks and hence likely sync candidate positions.

20. The device of claim 19 where the wherein the processing circuitry is further operative to identify a dominant network and from the dominate network identification and a dynamic range of its receiver, identify sub-bands likely falling below the radio network device receiver's dynamic range.

21. The device of claim 11 wherein the radio network device is a User Equipment.

22. The device of claim 11 wherein the radio network device is any one of a machine-to-machine M2M device, a machine-type communications MTC device, and a Narrowband Internet of Things NB IoT device.

* * * * *

UNITED STATES PATENT AND TRADEMARK OFFICE
CERTIFICATE OF CORRECTION

PATENT NO. : 10,517,053 B2
APPLICATION NO. : 16/062720
DATED : December 24, 2019
INVENTOR(S) : Ånström et al.

It is certified that error appears in the above-identified patent and that said Letters Patent is hereby corrected as shown below:

In the Specification

In Column 1, Line 7, delete "synchronizaion" and insert -- synchronization --, therefor.

In Column 1, Line 20, delete "promulgaes" and insert -- promulgates --, therefor.

In Column 1, Line 22, delete "interoperabilty" and insert -- interoperability --, therefor.

In Column 1, Line 23, delete "delined," and insert -- defined, --, therefor.

In Column 1, Line 44, delete "(`sync`)." and insert -- ("sync"). --, therefor.

In Column 2, Line 63, delete "liter" and insert -- filter --, therefor.

In Column 4, Line 12, delete "liter" and insert -- filter --, therefor.

In Column 5, Line 43, delete "liter" and insert -- filter --, therefor.

In Column 6, Line 25, delete "dangles," and insert -- dongles, --, therefor.

In Column 7, Line 8, delete "WIMax," and insert -- WiMax, --, therefor.

In Column 8, Line 5, delete "liter" and insert -- filter --, therefor.

Signed and Sealed this
Nineteenth Day of May, 2020

Andrei Iancu
*Director of the United States Patent and Trademark Office*